United States Patent [19]

Freise et al.

[11] Patent Number: 4,584,513
[45] Date of Patent: Apr. 22, 1986

[54] MOTOR/GENERATOR OPERATING ON THE RELUCTANCE PRINCIPLE

[75] Inventors: Werner Freise, Kaiserslautern; Herbert Fischer, Weisenheim, both of Fed. Rep. of Germany

[73] Assignee: Siemens Aktiengesellschaft, Munich and Berlin, Fed. Rep. of Germany

[21] Appl. No.: 530,300

[22] Filed: Sep. 8, 1983

[51] Int. Cl.[4] .......................... H02P 7/36; H02K 7/02
[52] U.S. Cl. .................................. 318/701; 318/138; 318/161; 318/254; 318/696; 310/74; 310/168
[58] Field of Search ............... 318/139, 161, 138, 150, 318/254, 696, 701; 180/65.2, 65.3, 65.4, 65.5, 165; 322/4; 310/74, 153, 168; 123/149 D

[56] References Cited

U.S. PATENT DOCUMENTS

| | | | |
|---|---|---|---|
| 3,629,632 | 12/1971 | Loupe | 123/149 D |
| 3,882,364 | 5/1975 | Wright et al. | 318/786 |
| 4,032,807 | 6/1977 | Richter | 310/64 X |
| 4,077,678 | 3/1978 | Studer et al. | 310/153 X |
| 4,085,355 | 4/1978 | Fradella | 318/703 |
| 4,211,930 | 7/1980 | Fengler | 290/15 |
| 4,218,624 | 8/1980 | Schiavone | 290/45 |
| 4,321,478 | 3/1982 | Plunkett et al. | 318/150 X |
| 4,346,773 | 8/1982 | Hofbauer et al. | 180/65.4 X |
| 4,347,145 | 8/1982 | Park et al. | 318/254 |
| 4,389,605 | 6/1983 | Noda | 318/254 X |
| 4,426,585 | 1/1984 | Bigalke | 290/38 B |
| 4,458,156 | 7/1984 | Maucher et al. | 310/74 X |

FOREIGN PATENT DOCUMENTS 56-86049 7/1981 Japan ...................... 310/74
1382622 2/1975 United Kingdom .............. 318/138

OTHER PUBLICATIONS

H. Majmudar, "Electromechanical Energy Converters", Allyn and Bacon, Inc., Boston, 1965, Chapter 2.
Conference Paper, IAS Annual Meeting, Sep. 28 to Oct. 3, 1980, Cincinnati, Ohio, USA, pp. 320-328, Authors Agarwal and Nelson.

Primary Examiner—William M. Shoop, Jr.
Assistant Examiner—Bentsu Ro
Attorney, Agent, or Firm—F. W. Powers; J. L. James

[57] ABSTRACT

For an internal combustion engine, such as a motor vehicle engine, operating on the principle of "flywheel utilization" an electromagnetic unit can be used both as a starter motor and as a generator. In addition, this unit is easily adaptable to the given flywheel dimensions and it involves as low a cost as possible for the controlling semiconductor components and for the exciter power. The invention proposes, among other things: (a) a stator with several independent sector stators arranged at tangential distance from each other, with pairs of toothed sector stator elements arranged at an axial distance a one behind the other and each having a radially projecting pole shank connected together by a flux return yoke; (b) a rotor with two rows of teeth mutually offset "tooth on gap" on the circumference of the clutch flywheel; and (c) use of MOS transistors for the electrical commutating of motor operation, the inverse diodes of which are utilized as rectifier elements in generator operation.

2 Claims, 11 Drawing Figures

MOTOR/GENERATOR OPERATING ON THE RELUCTANCE PRINCIPLE

BACKGROUND OF THE INVENTION

The invention relates to a motor/generator which operates on the reluctance principle, with a flywheel mass rotor. A typical motor/generator is disclosed in German Pat. No. DE-OS 29 17 139.

In this motor/generator, which is provided in connection with the internal combustion engine of a motor vehicle, the flywheel mass can be engaged by or disengaged from the crankshaft. In addition, the flywheel mass also forms the windingless rotor of the motor/generator which operates on the reluctance principle. The stator, which is not described in detail, is secured on the internal combustion engine or on the gearcase. The flywheel mass, which can be disengaged from the crankshaft by an additional clutch, is rotatable relative to the crankshaft when it is disengaged.

During brief stoppages, such as stopping for traffic lights, the flywheel mass is disengaged from the internal combustion engine so that it can continue to rotate even with the engine turned off. During subsequent restarting, the flywheel mass is re-engaged for starting the engine. In addition, during brief stoppages of the motor vehicle the flywheel mass is maintained by the motor/generator at a sufficient number of revolutions per minute to ensure starting of the engine when the flywheel is re-engaged by the engine. When the engine is in operation the motor/generator is switched to generator operation and electric power is provided to the vehicle battery.

SUMMARY OF THE INVENTION

It is the object of the present invention to provide a motor/generator with optimally matched mechanical, electromagnetic and circuit data so that a motor/generator which utilizes inexpensive circuitry can be manufactured at a low cost.

In general, the invention features, in one aspect, a motor/generator with flywheel rotor operating on a reluctance principle, having a stator with independent sector stators distributed over the circumference of the rotor of tangential distance from each other; each sector stator having at least two similarly toothed sector stator elements arranged at an axial spacing and with the axially aligned teeth one behind the other, with working windings in the grooves between the teeth and commutated via an electronic switching device; the teeth of each sector stator element being enveloped singly; each sector stator element terminating in a radially projecting pole shank, which is enveloped by a concentrated exciter winding part; the pole shanks of two sector stator elements of a sector stator arranged axially one behind the other are excited in the sense of opposite polarity and are axially connected on the outside by a flux return yoke; and a rotor provided with tooth rows evenly distributed over its circumference and connected for magnetic conduction, each having a pitch concording with double the pitch of a sector stator element, in such a way that each stator tooth row has a rotor tooth row correlated to it; wherein the switching device has MOS transistors for electronic switching elements for switching a working winding with at least four winding phases on and off, in which pairs of the winding phases fed in phase opposition are magnetically coupled together, and the circuit path to the current bypass of the winding phases just switched off is provided via an inverse diode of the MOS transistor for the winding phase which is magnetically coupled with the winding phase just switched off and is electrically offset to it by 180°.

In general, the invention features, in another aspect, a motor/generator with flywheel rotor operating on the reluctance principle, having a stator with independent sector stators distributed over the circumference of the rotor at tangential distance from each other; each sector stator having at least two similarly toothed sector stator elements arranged at an axial spacing and with axially aligned teeth one behind the other, with working windings in the grooves behind the teeth and commutated via an electronic switching device; the teeth of the sector stator element lying one behind the other being enveloped jointly by the phases correlated with them; each sector stator element terminating in a radially projecting pole shank, which is enveloped by a concentrated exciter winding part; the pole shanks of two sector stator elements of a sector stator arranged axially one behind the other are excited in the sense of opposite polarity and are axially connected on the outside by a flux return yoke; and a motor provided by the rows of teeth uniformly distributed over its circumference and connected for magnetic conduction, each having a pitch concording with double the pitch of a sector stator element, in such a way that each stator tooth row has a rotor tooth row correlated to it, wherein the switching device having MOS transistors for electronic switching elements for switching a working winding with at least four phases on and off, in which pairs of the winding phases fed in phase opposition are magnetically coupled together, and the current path to the current bypass of the winding phases is just switched off is provided via an inverse diode of the MOS transistor for the winding phase which is magnetically coupled with the winding phase just switched off and is electrically offset to it by 180°.

The motor/generator design of the present invention utilizes advantageously the relatively large diameter motor components of the motor crankcase and clutch flywheel disk as direct stator and rotor components. In this design the sector stators occupy only a small portion of the circumference and thus are not formed as a complete ring structure with the exciter windings, which makes them easy to apply and assures a low exciter power loss with the windingless, similarly toothed rotor gears of low yoke height. This design allows a motor/generator to be produced at low winding and circuit construction cost, which is extremely easy to mount, and where moreover the tangential interstices on both sides of the sector stators remain free for additional motor attachement parts; for example, coupling bolts between the internal combustion engine and the drive can be attached in a structurally advantageous manner.

The teeth of one half of each sector stator element are offset by 90° el. relative to the teeth of the other half of this sector stator element by a median tooth spacing increased by one half pitch. Also, the teeth of the rotor tooth rows similarly toothed over the entire circumference are mutually offset by one half pitch on the principle of "tooth on gap".

An advantageous method of winding is used in which the winding phase heads are prevented from crossing by forming the working winding of each stator sector as an even-numbered motor winding, such as a 4-phase synchronous motor winding with winding phases of equal coil width mutually offset by 90° el.

With the lapping of a tooth by two phases in phase opposition, the formation of stationary alternating fields and of braking moments caused thereby is avoided. At the same time it is possible to feed each phase of the working winding, when it is operated as a motor or generator, by a current flowing in one direction. Additionally, only a single semiconductor component can be provided in the feed path of each phase.

To further reduce the cost of the required circuitry, an embodiment of the invention provides that, for the commutation of the winding phases of the working winding in the motor operation fed from a d-c voltage source such as a battery, an electronic circuit with MOS transistors is used. The circuit's inverse diodes, in the MOS transistors, are then utilized in generator operation as rectifier diodes for the rectification of the generator alternating current. Advantageously, the electronic circuit elements intended for the commutation of the winding phases are made use of additionally for current control. In particular, they are used for current limitation by appropriate gating. In the bypass branches, controllable semiconductors are provided in the case of MOS transistors with additional diodes connected in series; to compensate the effect of the inverse diodes of these MOS transistors.

Other features and advantages of the present invention will become apparent from the following detailed description, and from the claims.

For a full understanding of the present invention, reference should now be made to the following detailed description and to the accompanying drawings.

BRIEF DESCRIPTION OF THE DRAWINGS

The invention, including various preferred embodiments, will be explained more specifically with reference to the following schematic representations.

DETAILED DESCRIPTION

Figure 1:
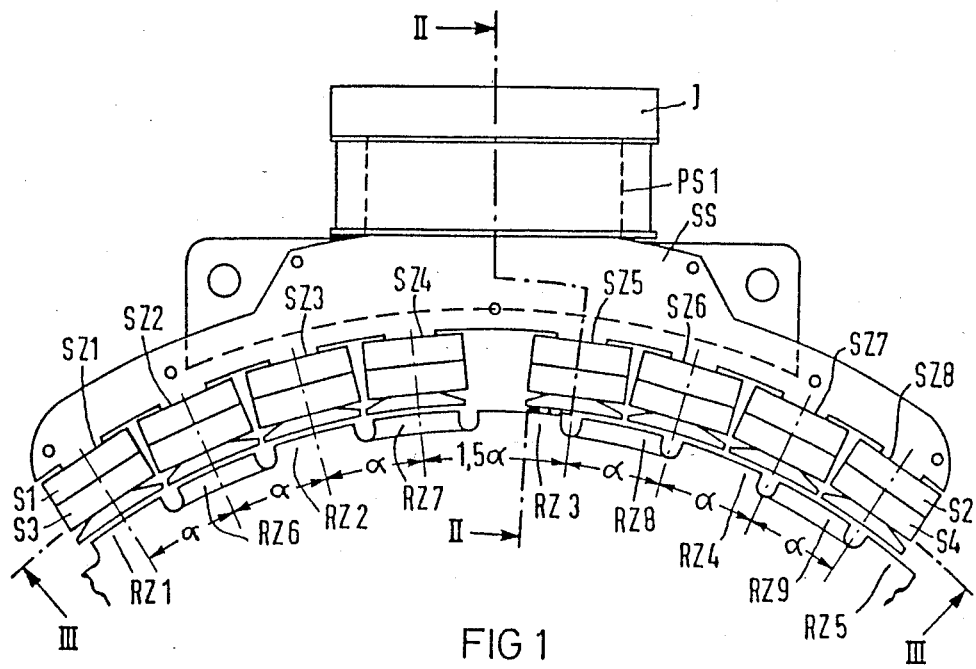
FIG. 1 shows an end view onto a sector stator.
Figure 2:
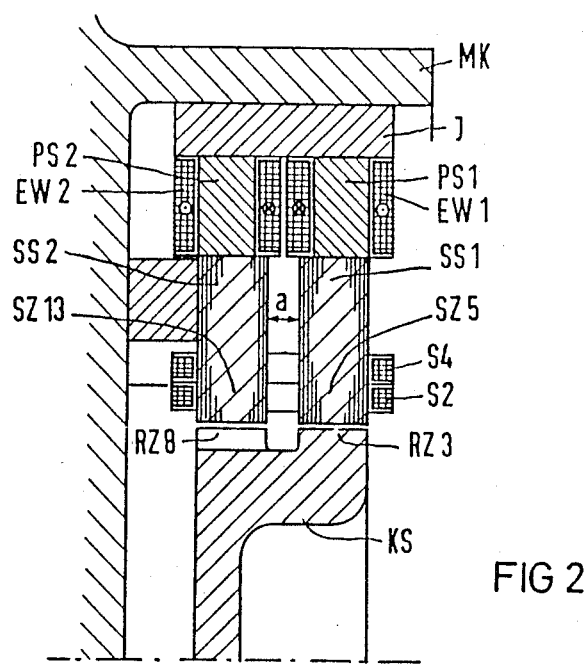
FIG. 2 shows in lateral section along line II—II in FIG. 1, the sector stator of FIG. 1 installed in the internal combustion engine of a motor vehicle.

FIG. 1 shows in an axial end view a separate sector stator SS, which according to FIG. 2 is secured, for example, to the motor crankcase MK of a motor vehicle engine. This stator extends over about 70° of the clutch disk KS of the internal combustion engine, of which the clutch disk is utilized as a rotor. Although the motor/generator of this invention can be used even when there is only one sector stator on the entire circumference, it is desirable to arrange pairs of tangentially spaced sector stators on the circumference of the motor crankcase MK in such a way that when the sector stators distributed along the circumference are connected together electrically, the voltages induced in each phase are cophasal as a whole.

The sector stator shown in FIG. 1, which is shown in more detail in FIG. 2, consists of two sector stator elements SS1 and SS2 magnetically insulated from each other at an axial spacing a, and located one behind the other. Each sector stator element SS1, SS2 has a total of eight teeth SZ1-SZ8 and SZ9-SZ16, respectively. The teeth of the first sector stator element SS1 are axially aligned with the teeth of the second sector stator element SS2. With regard to pitch, each sector stator element SS1, SS2 is divided into a left tooth group and a right tooth group. The left tooth group consists of front teeth SZ1-SZ4 which are shown in FIG. 1 and teeth SZ9-SZ12 which lie therebehind in axial alignment but which are not visible. The right tooth group consists of teeth SZ5-SZ8 which are shown in FIG. 1 of the front sector stator element SS1 and teeth SZ13-SZ16 of the second sector stator element SS2 which lies therebehind in axial alignement but which are not visible. The teeth of the left group and the teeth of the right group have among themselves the same tooth spacing; the left tooth group is offset by 90° el. relative to the right tooth group by a median tooth spacing increased by one half pitch.

The stator working winding is provided with a 4-phase winding, with phases S1, S2, S3, S4 of equal coil width and offset relative to each other by 90° el. Phases S1 and S3 are wound around the teeth of the left tooth group of the sector stator SS, and the phases S2 and S4 are wound around the teeth of the right tooth group of the sector stator SS. The arrangement and wiring of the winding phases S1-S4 according to the invention is evident from the stator development shown in FIG. 3, where the beginning A and end E of each phase S1-S4 are marked.

Each sector stator element SS1, SS2 terminates in a radially projecting pole shank PS1, PS2, and is enveloped by a concentrated exciter winding part EW1, EW2, which is designed as a preformed coil to be plugged on radially. As can be seen also from FIG. 2, the exciter winding parts EW1, EW2 are connected to a d-c voltage (optionally controllable) in such a way that the same current direction results in the two coil sides located between the sector stator elements SS1 and SS2. The pole ends of the pole shanks PS1 and PS2 are connected by a flux return yoke J.

As a rotor, the outer circumference of the clutch flywheel KS is utilized in such a way that at the circumference of the clutch flywheel disk two rows of teeth correlated with the rows of teeth of the first and second sector stator element SS1 and SS2 are provided; of these rows teeth RZ1-RZ5 of the front row and teeth RZ6-RZ9 of the rear row are visible in FIG. 1. Both rows are in magnetically conducting connection in that they are part of the solid steel clutch flywheel disk KS, which is shown in FIG. 2. Each of the two tooth rows of the clutch flywheel disk KS has a pitch over the entire circumference concording with double the pitch of the sector stator SS. However, the teeth of one row are offset relative to the teeth of the other row by one half pitch on the principle of "tooth on gap", so that in axial view the teeth of both rows succeed one another spaced along the circumference alternatively.

In the already described motor/generator design according to this invention, a specific flux pattern results. In this pattern the lines of flux of the exciting circuit enter, for example, from the teeth of the rotor tooth row, pass via the air gap into the sector stator element SS1, SS2 therebefore, concentrated via the pole shanks PS1, PS2 and the yoke J, then they pass via the axially offset sector stator element, via the teeth thereof and via the air gap therebefore as well as through the teeth of the other rotor tooth row, and finally returning axially to the original rotor tooth row. The field of the working winding extends essentially on one and the same axial plane.

The focusing of the exciting flux into the pole shanks makes possible an especially low exciter power loss. The pole equality of each rotor tooth row permits an unlaminated solid realization of the entire rotor, this being of particular advantage in the interest of strength and low rotor yoke height.

In addition the flux return yoke J and the pole shanks PS1, PS2 can also be unlaminated. For easy introduction of the coils of the winding phases S1-S4, which are preferably made in the form of preformed coils, it is desirable to produce the teeth of the sector stator elements as a whole or separately as a part, in particular stamped as cohering left and right tooth groups, wound, and then attached to the rest of the sector stator parts.

Figure 4:
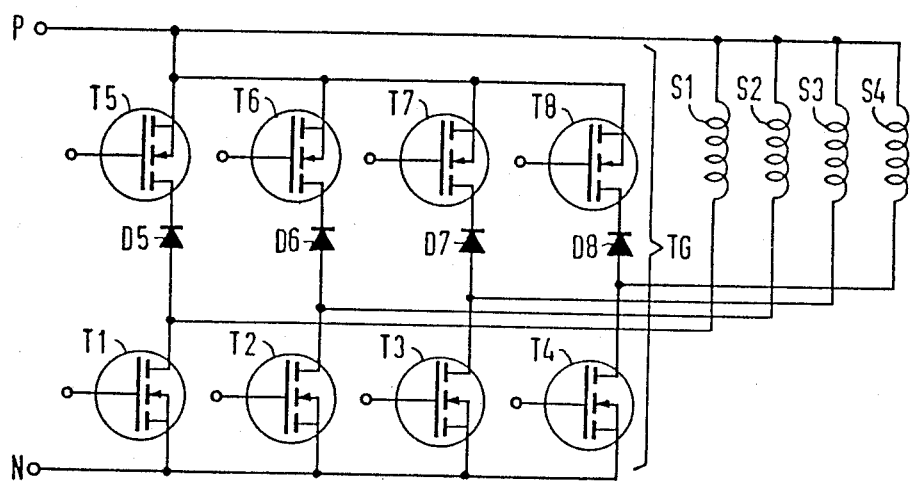
FIG. 4 shows a arrangement for connection to an electronic switching device for the commutation and possibly current limitation of the working winding of the sector stator.

FIG. 4 shows the circuit for connection to an electronic switching device for the commutation (forward switching) of the winding phases S1-S4 of the working winding of the sector stator SS. To this end a controllable semiconductor element in the form of a MOS transistor T1-T4 is connected in series with each winding phase S1-S4. This series connection is connected to the d-c voltage source P/N, which in motor operation is feeding and in generator operation is fed. In order to obtain minimum voltage drops in the commutation, only one semiconductor path is active in each circuit; this semiconductor path is used both for the switching of the winding phases S1-S4 and for current limitation of the currents flowing in these winding phases.

Figure 5:
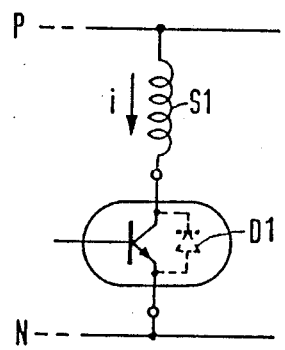
FIG. 5 shows the current flow in a winding phase of the working winding of the sector stator in motor operation.
Figure 6:
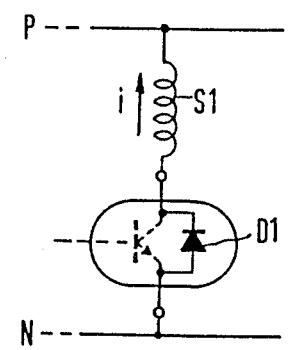
FIG. 6 shows the current flow in a winding phase of the sector stator in generator operation.

FIG. 5 is a further simplified schematic representation which shows the current flow in winding phases S1 in motor operation when the drain and the gate of the MOS transistors are positive relative to the source. FIG. 6 shows the same circuit with current flowing in the opposite direction in generator operation, and in which the inverse diode D1 becomes conducting without having to apply a controlled voltage to the gate of the MOS transistor.

To avoid an impermissibly high current in the winding phases S1-S4 and the MOS transistors at low speeds of rotation and low induced voltages, the MOS transistors are, according to the invention, cut in or out in the sense of a desired current limitation. This makes it unnecessary to have a separate current limiting transistor in the common lead, and in particular an additional voltage drop, which at the usual low power supply voltages of the motor/generator would cause a definite loss of efficiency.

The onward conduction of the current in the individual winding phases during the off times of the MOS transistors T1-T4 is ensured by controlled bypass transistors in the form of MOS transistors T5-T8, which are switched for conduction synchronously with the MOS transistors T1-T4 by the same clock generator or the same rotor position pickup, with a small time lag. In series with the bypass transistors T5-T8 are the doides D5-D8, which compensate the effect of the inverse diodes of the MOS transistors T5-T8.

The actuation of the MOS transistors T1-T4 and hence the clearing of the winding phases S1-S4 as well as the cutting in of the bypass transistors T5-T8 may be effected as a function of a rotor position pickup means or according to a given clock frequency program without the use of a special rotor position pickup means.

As previously discussed with regard to the sector stator of FIG. 1, where the teeth of one half of each sector stator element are spatially offset by 90° el. relative to the teeth of the other half of this sector stator element by a median tooth spacing increased by one half pitch, and where all phases of the working winding occur in a sector stator, full functionality of the motor/generator results also when only a single sector stator is provided at the circumference. However, to avoid magnetic forces acting radially on the rotor bearings, it is desirable for pairs of sector stators to be arranged opposite each other on the circumference as accurately as possible, despite the additional cost of winding connections between the sector stators belonging together.

However, in another embodiment of the invention the additional cost of winding connections can be avoided and at the same time great versatility with respect to the arrangement of the sector stator on the circumference can be achieved by taking into consideration the spaces already occupied, for example, by the unchangeable position of connecting screws between the internal combustion engine and the transmission, and the simple structural design of the sector stators. This particular embodiment of the invention is characterized by the following features:

(a) The teeth (SZ1-SZ8 and SZ9-SZ16, respectively) of each sector stator element are distributed uniformly over each sector stator element and similarly in both sector stator elements;

(b) at least two sector stators are provided on the bore circumference, and the two sector stators deviate from the exact diametrically opposed position by an odd multiple of one half the stator pitch ($\alpha$); and (c) the entire working winding consists of an even number of phases, with one half the number of phases being assigned to each of the two sector stators.

Figure 7:
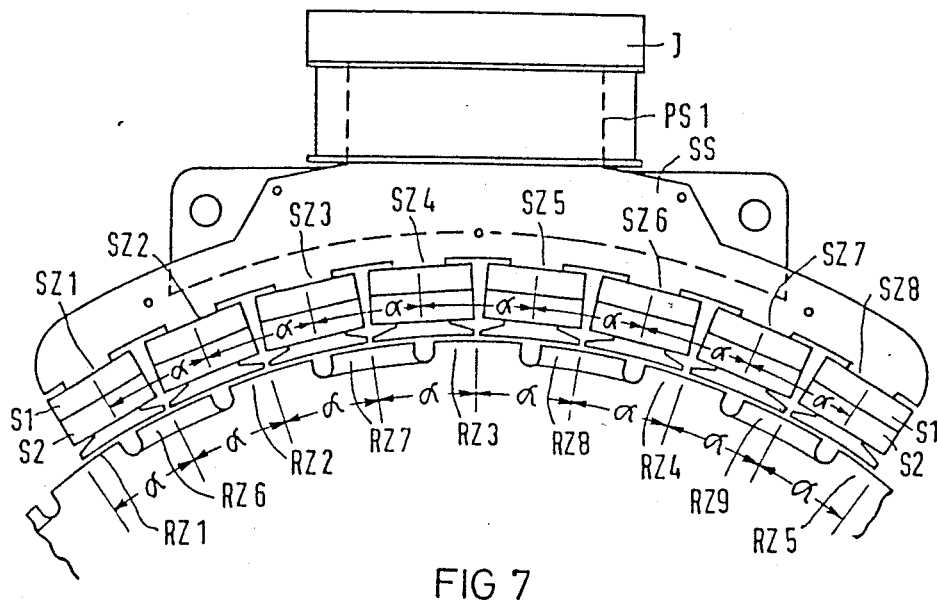
FIG. 7 shows a front end top view of an alternate sector stator design.
Figure 8:
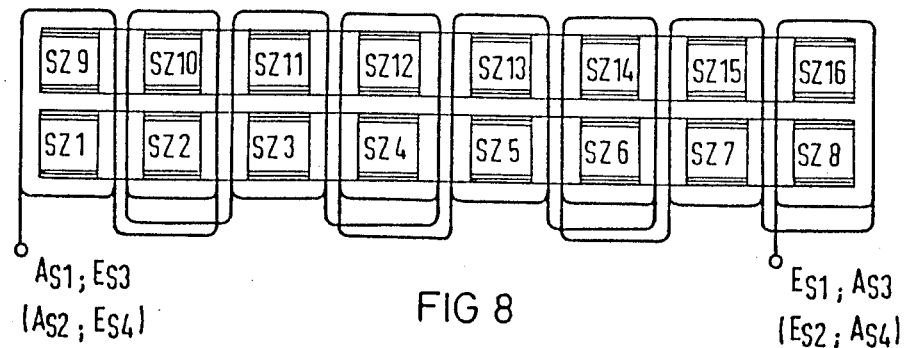
FIG. 8 shows the wiring of the sector stator of FIG. 7.

A correspondingly constructed single sector stator is illustrated in FIGS. 7 and 8. The terminals in parentheses in FIG. 8 relate to the winding of the second sector stator (not shown here), which, except for the above mentioned deviation, is arranged on the bore circumference opposite the first sector stator shown in FIG. 7.

The result is that in the opposite second sector stator, according to the deviation, voltages offset by 90° el. relative to those of the winding phases S1 and S3 in the other sector stator are induced in phases S2 and S4, as in FIG. 1, due to the offset arrangement.

The above variant with its numerical and angle data applies, of course, to the two- or four-phase design with an electrical shift of 90° el. One can transfer this basic solution to other arrangements, such as three- or six-phase ones, for which more sector stators of the type previously described under (a), become necessary accordingly. These additional sector stators are then arranged in accordance with the generally known rules for rotary field generation in the sense of minimum total radial magnetic tensile loads for all sector stators with a reciprocal circumferential offset angle $$\gamma = \alpha[n \pm (1/m)],$$

where $\alpha = 360°/2p$; n=integer characteristic number; m=phase number; and p=pole pair number.

Figure 3:
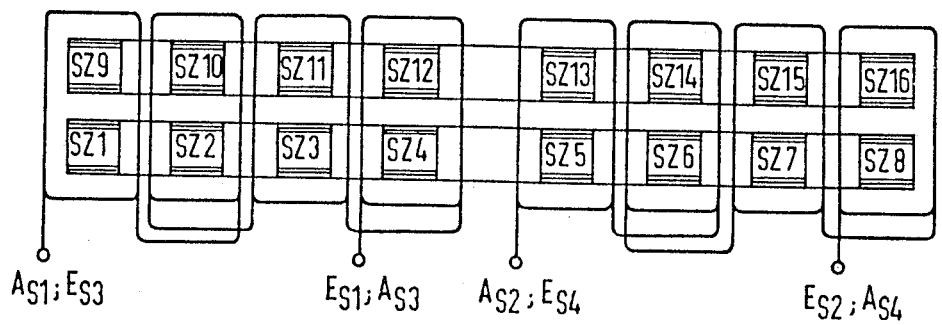
FIG. 3 shows the wiring of the working winding of the sector stator with reference to a sectional view along line III—III in FIG. 1.
Figure 10:
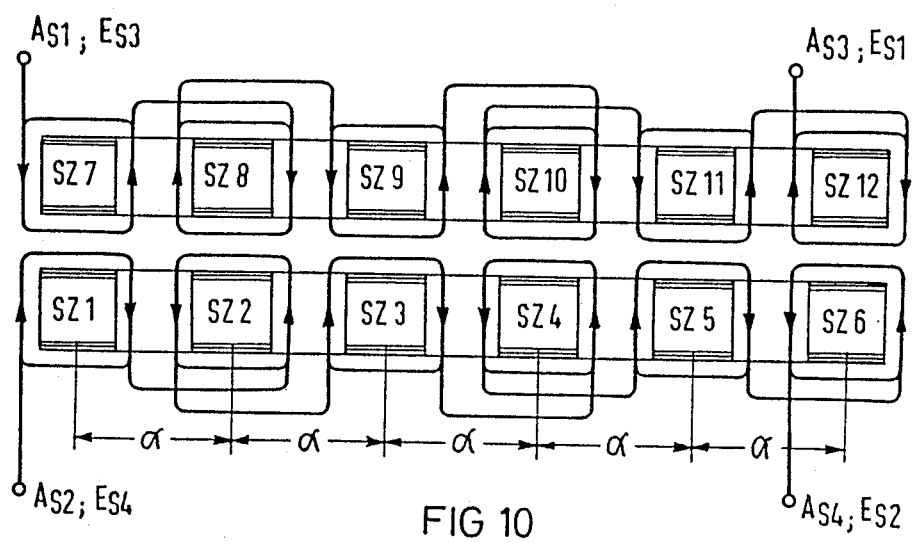
FIG. 10 shows a top view of a sector stator with a total of twelve teeth, with each tooth being singly enveloped by the winding phases assigned to it.
Figure 11:
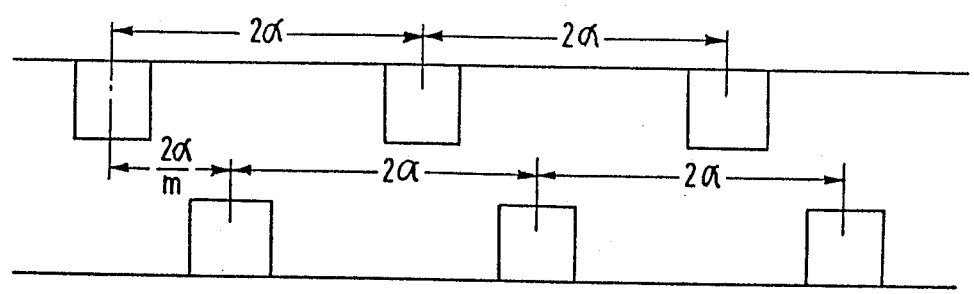
FIG. 11 shows a rotor utilized with the sector stator of FIG. 10, in which the teeth of the two rotor tooth rows are arranged relative to each other and deviating from the "tooth on gap" principle.

In the designs according to FIG. 1 and FIG. 3 two teeth arranged axially one behind the other and belonging to the different sector stator elements of a sector stator are jointly enveloped by winding phases in phase opposition. However, in the design of FIG. 10, each tooth of each sector stator element is enveloped singly by the phases assigned to them. Such a design of the working winding is advantageous especially when, for example, for structural or electrical reasons a greater axial distance between the sector stator elements of a sector stator would require too much copper for winding due to the common windings for pairs of teeth arranged one behind the other. The individual winding of the teeth shown in FIG. 10, can be used in combination with a rotor pitch according to FIG. 11, which is characterized by the fact that although each rotor tooth row is provided over its circumference with uniform pitch $2\alpha = 2(360°/2p)$ (where p=pole pair number of stator working winding), the rotor tooth rows are mutually offset on the circumference by the angle 2 $(\alpha/m)$ (where m=strand or phase number of the stator working winding). With this arrangement of the rotor tooth rows noise caused magnetically, for example, can be avoided to a large extent.

As an alternative to the structural designs of the sector stator elements illustrated in FIGS. 1, 2 and 7, respectively, it may be desirable, in order to avoid disturbing residual air gaps, to design the pole shanks $P_{S1}$ and $P_{S2}$, not as solid parts, but either together with the yoke J as a single U-shaped solid or laminated part or to provide the pole shanks as laminated parts of the sector stator elements SS1, SS2.

The mechanical and winding technology used in construction of the motor generator in the case of two winding phases which are introduced in magnetically close coupling, such as in identical grooves, are correlated to the same stator tooth, and are excited in phase opposition by the electronic switching device TG, permits a further reduction in the cost of the electronic control because the current path to the current bypass of a winding phase just switched off is provided via the MOS inverse diode of the winding phase which is magnetically closely coupled and electrically offset by 180°. Therefore, separate bypass circuits with additional transistors or diodes are unnecessary.

Figure 9:
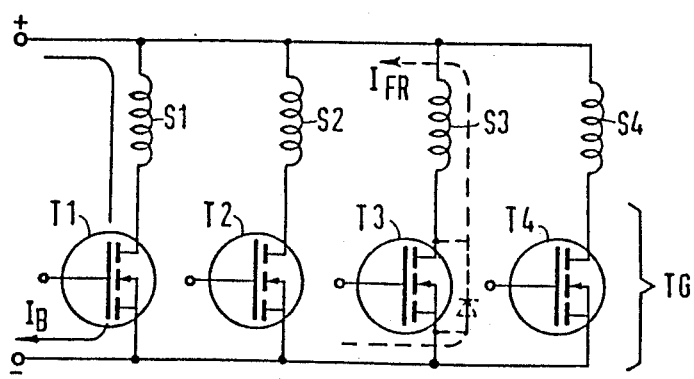
FIG. 9 shows a simplified circuit for connection to an electronic switching arrangement.

FIG. 9 shows a thus simplified electronic switching device TG for a working winding with four winding phases S1-S4, of which the phases S1, S3 and the phases S2, S4 are magnetically closely coupled together. The current paths show in solid contour the operating current $I_B$ with the winding phase S1 switched on and connected to the feeding power supply. The broken contour shows the bypass current IFR shortly after the winding phase S1 was switched off by the MOS transistor T1.

The onward conduction of the decaying current in the individual winding phases after switching off the MOS transistors T1–T4 through the inverse diodes in the transistors T1–T4 of the phase circuits each offset by 180° is ensured, as these circuits can, due to their arrangement in the same grooves, have a very small magnetic dispersion toward the considered phase. The inverse diodes limit the voltage load of the transistors switching off to about double the value of the supply voltage, which is the value which as regular cut-off voltage is inevitable anyway. The energy of the weak magnetic stray field can easily be absorbed in the usual protective wiring elements.

The excitation of the MOS transistors T1–T4 can take place as a function of a rotor position detection device or according to a given clock frequency program. At the same time the voltages induced in the windings can be evaluated as to amount and phase, as a position signal.

There has thus been shown and described a novel method for a motor/generator operating on the reluctance principle which fulfills all the object and advantages sought. Many changes, modifications, variations and other uses and application of the subject invention will, however, become apparent to those skilled in the art after considering this specification which discloses embodiments thereof. All such changes, modifications, variations and other uses and applications which do not depart from the spirit and scope of the invention are deemed to be covered by the invention which is limited only by the claims which follow.

What is claimed is:

1. In a motor/generator with flywheel rotor operating on the reluctance principle, having a stator with independent sector stators distributed over the circumference of the rotor at tangential distance from each other; each sector stator having at least two similarly toothed sector stator elements arranged at an axial spacing and with axially aligned teeth one behind the other, with working windings in the grooves between the teeth and commutated via an electronic switching device; the teeth of each sector stator element being enveloped singly; each sector stator terminating in a radially projecting pole shank, which is enveloped by a concentrated exciter winding part; the pole shanks of two sector stator elements of a sector stator arranged axially one behind the other are excited in the sense of opposite polarity and are axially connected on the outside by a flux return yoke; and a rotor provided with rows of teeth uniformly distributed over its circumference and connected for magnetic conduction, each having a pitch concording with double the pitch of a sector stator element, in such a way that each stator tooth row has a rotor tooth row correlated to it, the improvement comprising said switching device having MOS transistors for electronic switching elements for switching a working winding with at least four winding phases on and off, wherein pairs of said winding phases fed in phase opposition are magnetically coupled together, and the current path to the current bypass of said winding phase just switched off is provided via an inverse diode of said MOS transistor for said winding phase which is magnetically coupled with said winding phase just switched off and is electrically offset to it by 180°.

2. In a motor/generator with flywheel rotor operating on the reluctance principle, having a stator with independent sector stators distributed over the circumference of the rotor at tangential distance from each other; each sector stator having at least two similarly toothed sector stator elements arranged at an axial spacing and with axially aligned teeth one behind the other, with working windings in the grooves behind the teeth and commutated via an electronic switching device; the teeth of the sector stator element lying one behind the other being enveloped jointly by the phases correlated with them; each sector stator element terminating in a radially projecting pole shank, which is enveloped by a concentrated exciter winding part; the pole shanks of two sector stator elements of a sector stator arranged axially one behind the other are excited in the sense of opposite polarity and are axially connected on the outside by a flux return yoke; and a rotor provided with rows of teeth uniformly distributed over its circumference and connected for magnetic conduction, each having a pitch concording with double the pitch of a sector stator element, in such a way that each stator tooth row has a rotor tooth row correlated to it, the improvement comprising, said switching device having MOS transistors for electronic switching elements for switching a working winding with at least four winding phases on and off, wherein pairs of said winding phases fed in phase opposition are magnetically coupled together, and the current path to the current bypass of said winding phase just switched off is provided via an inverse diode of said MOS transistor for said winding phase which is magnetically coupled with said winding phase just switched off and is electrically offset to it by 180°.

* * * * *